United States Patent
Lin

(10) Patent No.: US 8,208,236 B2
(45) Date of Patent: Jun. 26, 2012

(54) POWER CONVERTER AND METHOD THEREOF

(75) Inventor: Chien-Liang Lin, Hsin-Chu (TW)

(73) Assignee: Leadtrend Technology Corp., Science-Based Industrial Park, Hsin-Chu (TW)

( * ) Notice: Subject to any disclaimer, the term of this patent is extended or adjusted under 35 U.S.C. 154(b) by 51 days.

(21) Appl. No.: 12/704,540

(22) Filed: Feb. 12, 2010

(65) Prior Publication Data

US 2010/0208394 A1     Aug. 19, 2010

(30) Foreign Application Priority Data

Feb. 19, 2009 (TW) .............................. 98105243 A

(51) Int. Cl.
*H02H 3/08* (2006.01)
*H02H 9/02* (2006.01)
*H02H 9/00* (2006.01)

(52) U.S. Cl. ........................................ 361/93.1; 361/18
(58) Field of Classification Search .................. 361/93.1
See application file for complete search history.

(56) References Cited

U.S. PATENT DOCUMENTS

| 4,686,617 | A  | * | 8/1987  | Colton       | 363/56.1  |
|-----------|----|---|---------|--------------|-----------|
| 6,813,170 | B2 | * | 11/2004 | Yang         | 363/56.09 |
| 6,879,501 | B2 | * | 4/2005  | Mori         | 363/56.03 |
| RE39,933  | E  | * | 12/2007 | Hall et al.  | 363/21.13 |
| 7,518,836 | B2 | * | 4/2009  | Kim et al.   | 361/18    |
| RE41,908  | E  | * | 11/2010 | Hall et al.  | 363/21.13 |

* cited by examiner

*Primary Examiner* — Dharti Patel
(74) *Attorney, Agent, or Firm* — Winston Hsu; Scott Margo

(57) ABSTRACT

A power converter includes a transformer, a switch element, a control circuit, an over-current detecting circuit, and a compensation signal generating circuit. The transformer includes a primary winding and at least an auxiliary winding. The control circuit is coupled to the switch element, and controls on/off status of the switch element to control a primary current flowing through the primary winding. The over-current detecting circuit compares the primary current with a current limit, and then controls the control circuit to turn off the switch element if the primary current is greater than the current limit. The compensation signal generating circuit is coupled between the auxiliary winding and over-current detecting circuit, and provides an adjustment value to calibrate the current limit according to an output of the auxiliary winding; wherein the adjustment value varies with time when the switch element is turned on.

12 Claims, 7 Drawing Sheets

US 8,208,236 B2

POWER CONVERTER AND METHOD THEREOF

BACKGROUND OF THE INVENTION

1. Field of the Invention

The present invention relates to a power converter, and more particularly, to a power converter for calibrating its over-current mechanism according to an output of an auxiliary winding, and a related method.

2. Description of the Prior Art

FIG. 1 is a circuit diagram showing a conventional flyback AC/DC power converter 100 for receiving an AC line voltage $V_{AC}$ to provide an output voltage $V_{out}$ to a load component 101. As shown in FIG. 1, the power converter 100 includes a bridge rectifier 105, a transformer 110, two rectifier diodes $D_{out}$ and $D_{aux}$, a switch element 115, a control circuit 120, a detecting circuit 125, and a compensation resistor $R_{comp}$. Control circuit 120 controls a duty cycle of switch element 115 for controlling output voltage $V_{out}$. Control circuit 120 can detect, through detecting circuit 125, whether the current flowing through switch element 115 and transformer 110 exceeds a current limit $I_{limit}$, that is, whether an over-current phenomenon is occurred. If the over-current phenomenon is occurred, control circuit 125 will turn off switch element 115 lest damages occur on switch element 115 or the inductors inside transformer 110.

Within a permitted voltage extent of input voltage source $V_{in}$, power converter 100 should be designed to make output voltage $V_{out}$ have a fixed output power when the over-current phenomenon is occurred. When input voltage source $V_{in}$ is at high line (e.g., 265V) and the over-current phenomenon is occurred, power converter 100 could operate in a discontinuous conduction mode, and thus its converted energy within a switch period can be inferred as $P_{t\text{-}265}=\frac{1}{2}\times L_P \times I_{limit\text{-}265V}^2$, wherein $L_P$ represents inductance of the primary winding of transformer 110, and $I_{limit\text{-}265V}$ represents the current limit used when the input voltage source $V_{in}$ is as high as 265V. However, when input voltage source $V_{in}$ is at low line (e.g., 90V) and the over-current phenomenon is occurred, power converter 100 could operate in a continuous conduction mode, and thus its converted energy within a switch period can be inferred as $P_{t\text{-}90}=\frac{1}{2}\times L_P \times (I_{limit\text{-}90V}^2-I_{O\text{-}90V}^2)$, wherein $I_{limit\text{-}90V}$ represents the current limit used when the input voltage source $V_{in}$ is as low as 90V, and $I_{O\text{-}90V}$ represents an initial current value of the primary winding of transformer 110. As can be seen, in order to make the equation of $P_{t\text{-}265}=P_{t\text{-}90}$ true, the current limit $I_{limit\text{-}90V}$ needs to be designed to be greater than the current limit $I_{limit\text{-}265V}$. In FIG. 1, compensation resistor $R_{comp}$ is just used to make the current limit $I_{limit}$ lower if the voltage level of input voltage source $V_{in}$ is higher.

Be noted that compensation resistor $R_{comp}$ effectively raises the voltage level of the positive input terminal of comparator 1250 based on the voltage rectified by bridge rectifier 105, so that the current limit $I_{limit}$ for over-current protection can be calibrated. The higher the input voltage source $V_{in}$, the higher fixed voltage level $V_{lift}$ post to the positive input terminal of comparator 1250, and the smaller the current flowing through switch element 115 for triggering the over-current protection. As a result, the current limit $I_{limit}$ for detecting circuit 125 will decrease as the voltage level of input voltage source $V_{in}$ increases.

However, the design for compensation resistor $R_{comp}$ damages energy-saving ability of the power converter 100, as summarized in the following:

(1) A permanent leakage path flowing from input voltage source $V_{in}$ to a ground terminal is caused by compensation resistor $R_{comp}$ which results in useless power consumption permanently.

(2) Power converter 100 may not enter the power-saving mode at light load or no load with high line. The power-saving mode must be triggered only when a compensation signal $V_{COM}$ (an error signal result from comparing the output voltage of output voltage source $V_{out}$ with a target voltage) is smaller than a certain extent $V_{COM\text{-}BURST}$. In addition, an output voltage control mode called as a current mode is used for restricting a current peak value flowing through switch element 115 according to the output voltage of output voltage source $V_{out}$. In practice, the voltage level at the positive input terminal of comparator 1250 is compared with the compensation signal $V_{COM}$, and its comparison result controls on/off status of switch element 115. In the circuit shown in FIG. 1, regardless of light load or heavy load, compensation resistor $R_{COMP}$ constantly provides the fixed voltage level $V_{lift}$ to the positive input terminal of comparator 1250. In case that before being low enough to trigger the power-saving mode, the compensation signal $V_{COM}$ has been smaller than the fixed voltage level $V_{lift}$, switch element 115 will be turned off constantly. In this condition, power converter 100 does not perform energy conversion, the output voltage of output voltage source $V_{out}$ is not increased, and, as a result, the compensation signal $V_{COM}$ cannot be decreased further to trigger the power-saving mode. That is to say, the higher the voltage source $V_{in}$, the higher the fixed voltage level $V_{lift}$, the higher the minimum voltage of the compensation signal $V_{COM}$. If the minimum voltage of the compensation signal $V_{COM}$ is higher than the threshold for triggering the power-saving mode, the power-saving mode is never activated.

SUMMARY OF THE INVENTION

According to an embodiment of the present invention, a power converter is provided. The power converter includes a transformer, a switch element, a control circuit, an over-current detecting circuit, and a compensation signal generating circuit. The transformer includes a primary winding and at least an auxiliary winding. The control circuit is coupled to a control terminal of the switch element and controls on/off status of the switch element to control a primary current flowing through the primary winding. The over-current detecting circuit compares the primary current with a current limit, and then controls the control circuit to turn off the switch element if the primary current is greater than the current limit. The compensation signal generating circuit is coupled between the auxiliary winding and over-current detecting circuit, and provides an adjustment value to calibrate the current limit according to an output of the auxiliary winding; wherein the adjustment value varies with time when the switch element is turned on.

According to another embodiment of the present invention, a method applied to a power converter is provided, wherein the power converter at least includes a switch element and a transformer having a primary winding as well as at least one auxiliary winding. The method includes the steps of: controlling on/off status of the switch element so as to control a primary current flowing through the primary winding; comparing the primary current with a current limit, and turning off the switch element if the primary current is greater than the current limit; and when the switch element is turned on, providing an adjustment value varying with time to calibrate the current limit according to an output of the auxiliary winding.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
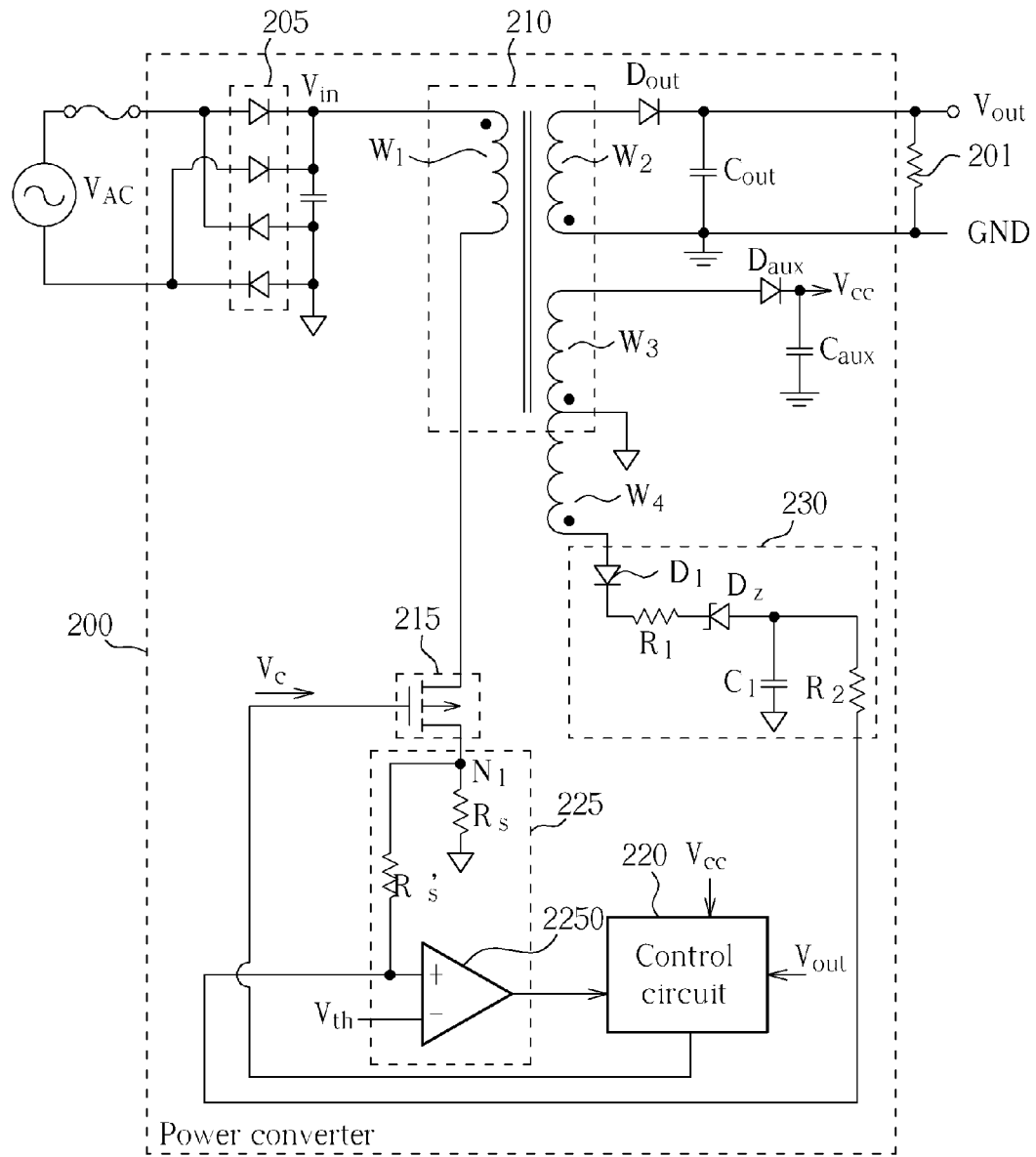
FIG. 2 is a circuit diagram of a flyback power converter according to a first embodiment of the present invention.

FIG. 2 is a circuit diagram of a flyback power converter 200 according to a first embodiment of the present invention. Flyback power converter 200 receives an AC line voltage $V_{AC}$ so as to provide an output voltage $V_{out}$ to a load component 201, and it includes a bridge rectifier 205, a transformer 210, two rectifier diodes $D_{out}$ and $D_{aux}$, two capacitors $C_{out}$ and $C_{aux}$, a switch element 215, a control circuit 220, an over-current detecting circuit 225, and a compensation signal generating circuit 230. Transformer 210 consists of a primary winding $W_1$, a secondary winding $W_2$, and two windings $W_3$ and $W_4$ cascaded to form an auxiliary winding. In addition, an output terminal of winding $W_3$ is used for providing an operating power $V_{CC}$ to control circuit 220, and an output terminal of winding $W_4$ is connected to compensation signal generating circuit 230. In this embodiment, switch element 215 is embodied as a transistor, which is used for controlling a primary current flowing through primary winding $W_1$.

In this embodiment, control circuit 220 may be a pulse width modulation (PWM) control circuit, outputting a control signal $V_C$ to control on/off status and the duty cycle of switch element 215 according to an output voltage $V_{out}$, so that both output voltage $V_{out}$ and the primary current flowing through primary winding $W_1$ and switch element 215 can be controlled. Furthermore, the action of detecting whether an over-current phenomenon is occurred is implemented by over-current detecting circuit 225. Over-current detecting circuit 225 compares the primary current with a current limit $I_{limit}$. If the primary current is greater than the current limit $I_{limit}$, over-current detecting circuit 225 notifies control circuit 220 to turn off switch element 215. In more detail, over-current detecting circuit 225 includes two resistors $R_S$ and $R_S'$ and a comparator 2250. Since a voltage level of a joint node $N_1$ between switch element 215 and resistor $R_S$ (also called a detecting resistor) can approximately represent the current flowing through switch element 215 (i.e., the aforementioned primary current), operations of comparator 2250 can be implemented by comparing the voltage level of joint node $N_1$ with a threshold voltage $V_{th}$. If the voltage level of joint node $N_1$ is greater than threshold voltage $V_{th}$, it is determined that an over-current phenomenon occurs. At this time, comparator 2250 outputs a notice signal to notify control circuit 220, which accordingly turns off switch element 215. If compensation signal generating circuit 230 provides no adjustment value and is deemed open circuit, the current limit $I_{limit}$ will probably be a constant and is substantially equal to a constant value $V_{th}/R_S$.

Compensation signal generating circuit 230 is used for providing an adjustment value to calibrate or compensate the voltage level at a positive input terminal of comparator 2250, equivalent to calibrate the current limit $I_{limit}$. As an illustration, when the voltage level at the positive input terminal of comparator 2250 is pulled up by compensation signal generating circuit 230, the primary current flowing through primary winding $W_1$ and resistor $R_S$ consequently needs a smaller current value to make the voltage level at the positive input terminal of comparator 2250 reach threshold voltage $V_{th}$ to trigger an over-current protection. In order words, the current limit $I_{limit}$ used as over-current detections is equivalently lowered.

Figure 3:
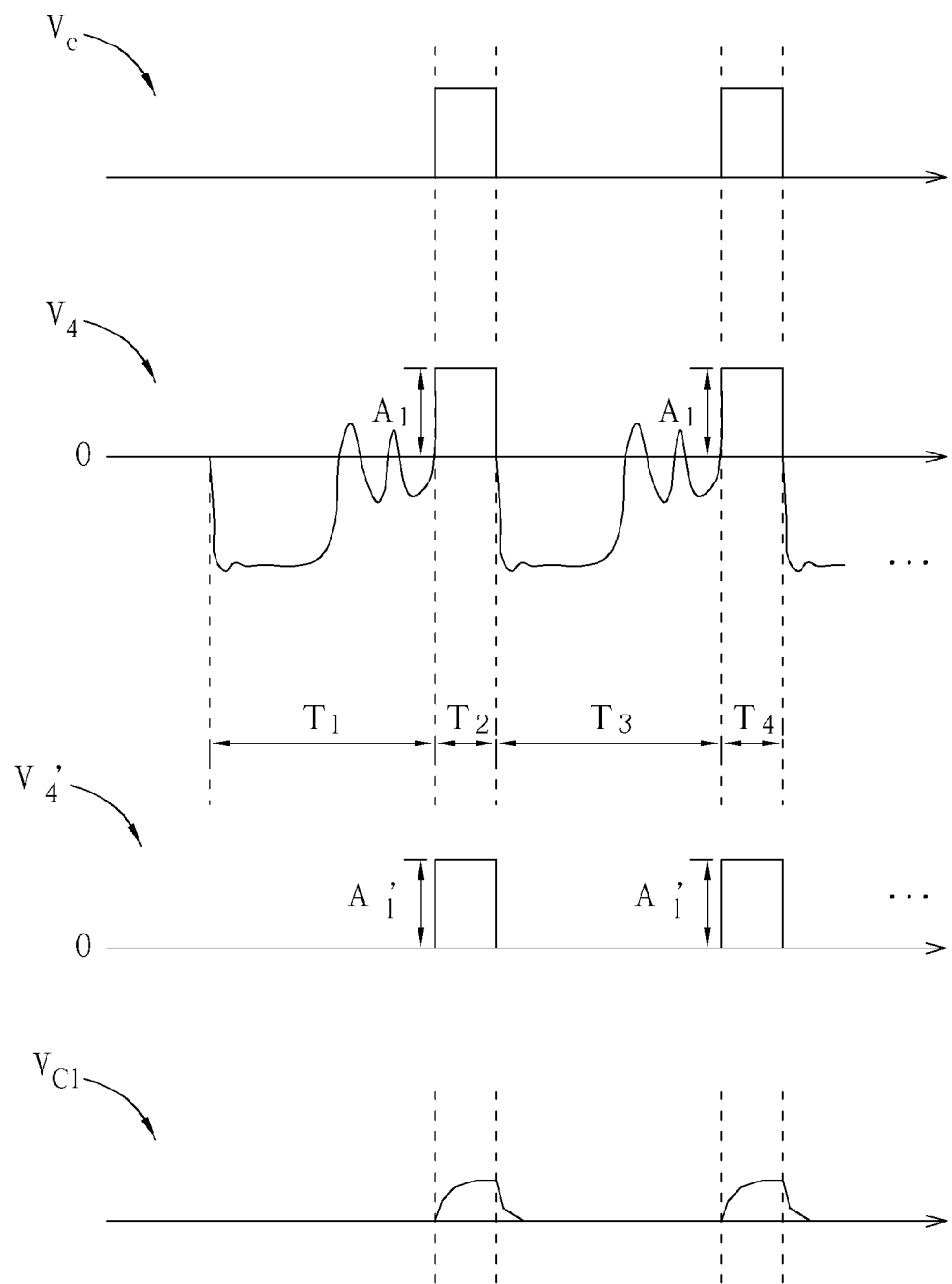
FIG. 3 is a diagram showing waveforms of the control signal $V_c$, the output voltage $V_4$ of the second winding $W_4$ of the transformer, the output voltage $V_4'$ of the rectifier diode $D_1$, and the cross voltage $V_{C1}$ of the capacitor $C_1$ shown in FIG. 2.

In operations, when switch element 215 is turned on, compensation signal generating circuit 230 provides the adjustment value to calibrate the current limit $I_{limit}$ according to the output of winding $W_4$. When switch element 215 is turned off, winding $W_3$ of the auxiliary winding provides operating power $V_{CC}$ to control circuit 220. In this embodiment, compensation signal generating circuit 230 includes a rectifier diode $D_1$, two resistors $R_1$ and $R_2$, a Zener diode $D_Z$, and a capacitor $C_1$, wherein resistor $R_1$ together with capacitor $C_1$ can be viewed as a low-pass filter. Please refer to FIG. 3, which is a diagram showing waveforms of the control signal $V_c$, the output voltage $V_4$ of winding $W_4$ of transformer 210, the output voltage $V_4'$ of rectifier diode $D_1$, and the cross voltage $V_{C1}$ of capacitor $C_1$ shown in FIG. 2. As FIG. 3 depicts, the waveform of output voltage $V_4$ has cyclical variations. Herein the variations during durations $T_1$ and $T_3$ are resulted from turn-off status of switch element 215, and the variations during durations $T_2$ and $T_4$ are resulted from the turn-on status of switch element 215 as being induced voltage by reflecting the voltage drop of primary winding $W_1$. Moreover, rectifier diode $D_1$ is used for filtering out portions of the signal lower than its own threshold voltage $V_{D1}$. When the voltage level of output voltage $V_4'$ is greater than a reverse breakdown voltage of Zener diode $D_Z$, the low-pass filter (including resistor $R_1$ and capacitor $C_1$) starts to work, and then cross voltage $V_{C1}$ starts to increase with time, as shown in FIG. 3. Cross voltage $V_{C1}$ will affect the voltage level at the positive input terminal of comparator 2250 via resistor $R_2$, which is equivalent to change the current limit $I_{limit}$ used for comparison in over-current detecting circuit 225.

Please note that when power converter 200 is at light load or no load, compensation signal generating circuit 230 can be designed to generate almost no adjustment value, providing no calibrations or compensations to the voltage level at the positive input terminal of comparator 2250. The duty cycle becomes smaller at light load or no load, that is, the turn-on time of switch element 215 becomes relatively shorter. Be reference to FIG. 3, if duration $T_2$ or $T_4$ is too short, output voltage $V_4'$ is unable to charge capacitor $C_1$ effectively, and thus the charged cross voltage $V_{C1}$ of capacitor $C_1$ could be deemed as zero. In other words, the low-pass filter, formed by resistor $R_1$ and capacitor $C_1$, is capable of filtering out the influence from small duty cycles, equivalent providing no adjustment value to calibrate the voltage level at the positive input terminal of comparator 2250, so that the current limit $I_{limit}$ used for comparisons in over-current detecting circuit 225 won't be adjusted. On the other hand, when power converter 200 is at heavy load, the duty cycle becomes larger, and the duration $T_2$ or $T_4$ becomes longer as well. And thus the charged cross voltage $V_{C1}$ of capacitor $C_1$ becomes larger, being not ignored. As a result, the current limit $I_{limit}$ used for comparisons in over-current detecting circuit 225 can be obviously calibrated.

What is more, when AC line voltage $V_{AC}$ of power converter 200 is at low line, compensation signal generating circuit 230 can be designed to generate almost no adjustment value; but when AC line voltage $V_{AC}$ is at high line, compensation signal generating circuit 230 would generate the adjustment value to calibrate or compensate the voltage level at the positive input terminal of comparator 2250. The voltage level $A_1$ of the output voltage $V_4$ shown in duration $T_2$ or $T_4$ of FIG. 3 reflects the voltage level of input voltage source $V_{in}$, which is positively correlated to AC line voltage $V_{AC}$. As can be known from FIG. 3 and FIG. 2, voltage level $A_1$ is required to be greater than the threshold voltage $V_{D1}$ of diode $D_1$ and the reverse breakdown voltage of Zener diode $D_Z$ for charging capacitor $C_1$ and affecting the current limit $I_{limit}$. In one word, only when output voltage $V_4$ of winding $W_4$ is greater than a voltage default value, can the adjustment value be provided to over-current detecting circuit 225. If the threshold voltage $V_{D1}$ of diode $D_1$ is ignorable, this voltage default value can substantially be determined by the reverse breakdown voltage of Zener diode D. In summary, only when AC line voltage $V_{AC}$ is greater than a certain extent, can over-current detecting circuit 225 be affected. As an illustration, with a suitable Zener diode, compensation signal generating circuit 230 may not generate the adjustment value when AC line voltage $V_{AC}$ of power converter 200 is lower than 180V, but may do when the AC line voltage $V_{AC}$ is greater than 180V.

In one embodiment, by appropriately selecting the values of the elements shown in FIG. 2, compensation signal generating circuit 230 will affect over-current detecting circuit 225 to calibrate or compensate the voltage level at the positive input terminal of comparator 2250 only when power converter 200 is at high line, heavy load, or both. When the power converter is at low line or light load, the over-current protection is not an issue, so compensation signal generating circuit 230 will not affect over-current detecting circuit 225.

Figure 1:
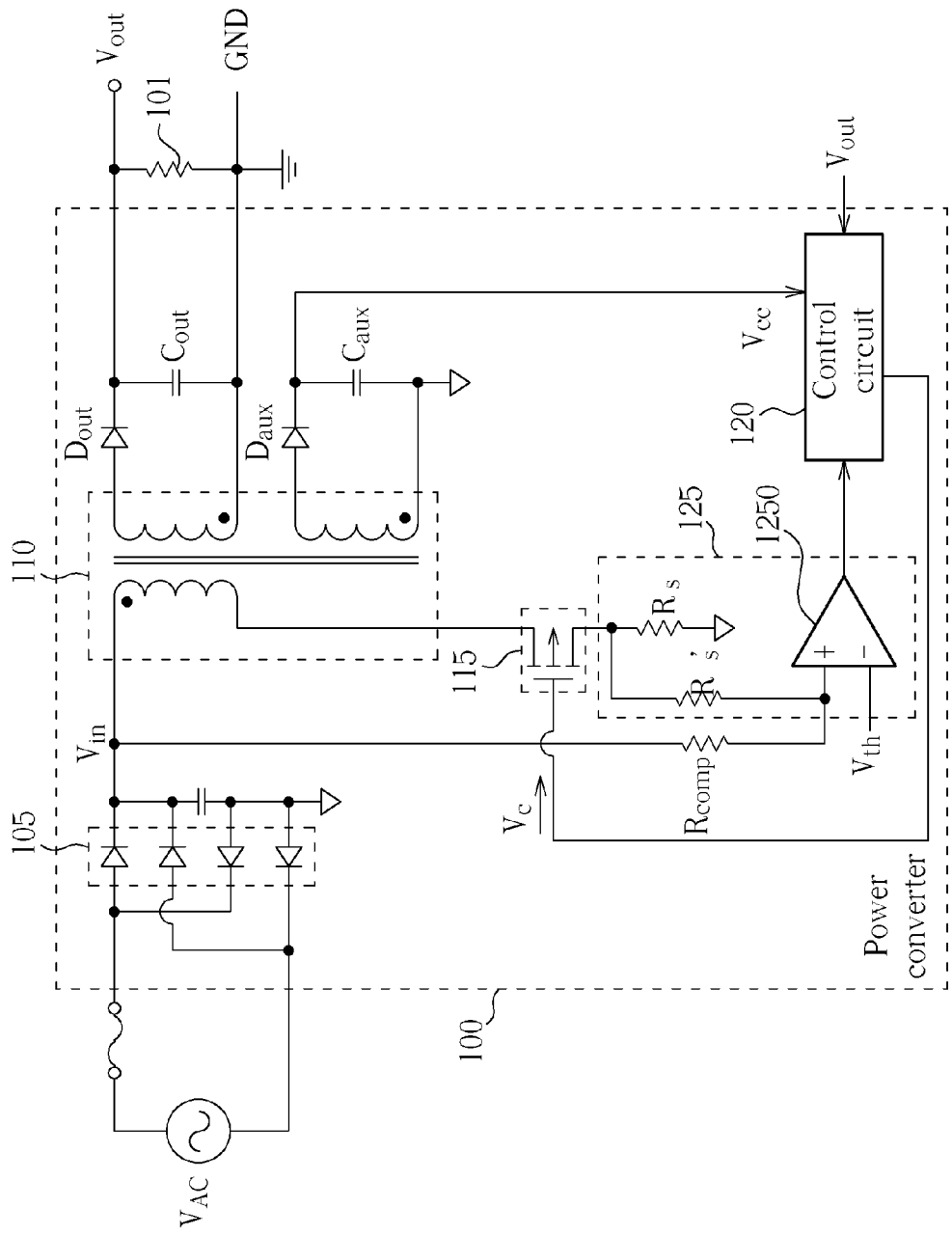
FIG. 1 is a circuit diagram of a conventional flyback power converter according to the prior art.

Compared the embodiment of FIG. 2 with the embodiment of FIG. 1, power converter 200 does not provide a permanent leakage path shown in FIG. 1. As a result, when switch element 215 is turned off, power converter 200 shown in FIG. 2 almost consumes no power, considerably saving the energy. In addition, the issue that the power converter is unable to enter the power-saving mode at light load or no load with high line in FIG. 1 can be solved in the embodiment of FIG. 2. This is because, in the embodiment of FIG. 2, compensation signal generating circuit 230 can be designed to not affect over-current detecting circuit 225 at light load or no load.

Figure 4A:
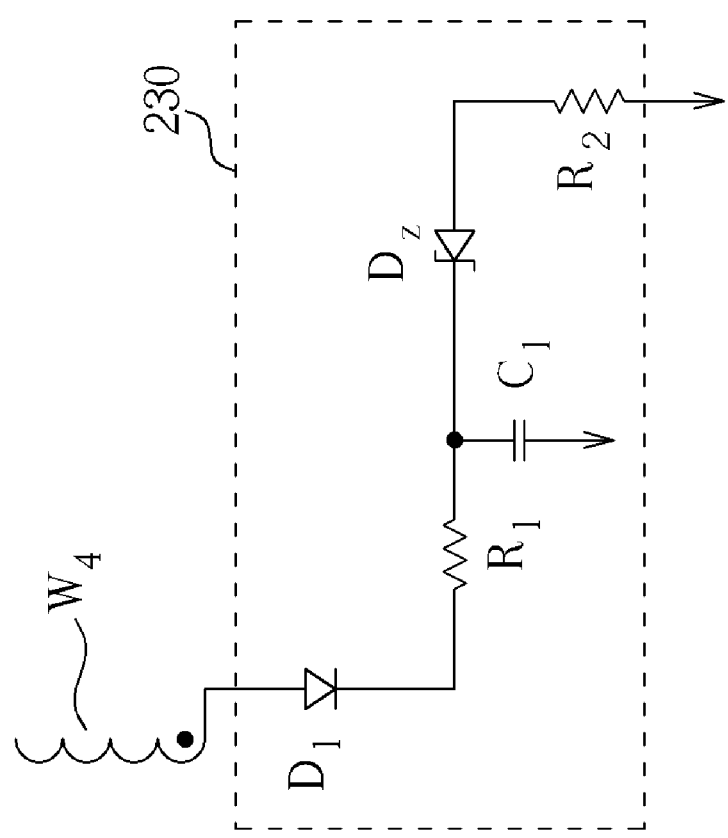
FIG. 4A is a circuit diagram of the compensation signal generating circuit shown in FIG. 2 according to another varied embodiment of the present invention.

In one embodiment, compensation signal generating circuit 230 can be implemented by replacing it with the circuit type shown in FIG. 4A. In one embodiment, Zener diode $D_Z$ of compensation signal generating circuit 230 shown in FIG. 4A can be relocated to be between rectifier diode $D_1$ and resistor $R_1$. Various design modifications to the locations of the circuit components also belongs to the scope of the present invention under the operations that compensation signal generating circuit 230 can provide the adjustment value.

Figure 4B:
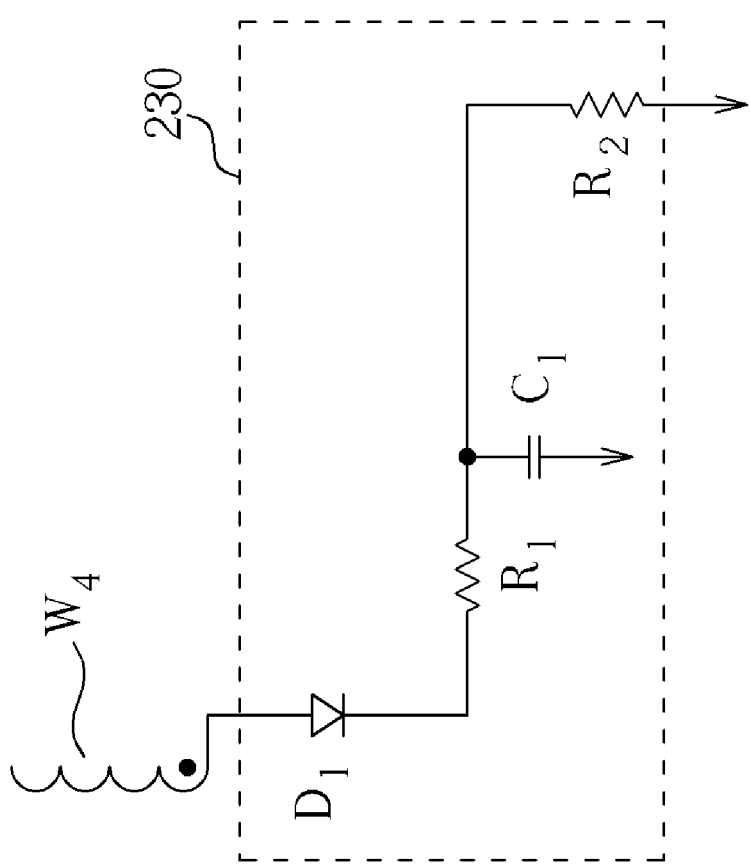
FIG. 4B is a circuit diagram of the compensation signal generating circuit shown in FIG. 2 according to a third varied embodiment of the present invention.
Figure 4C:
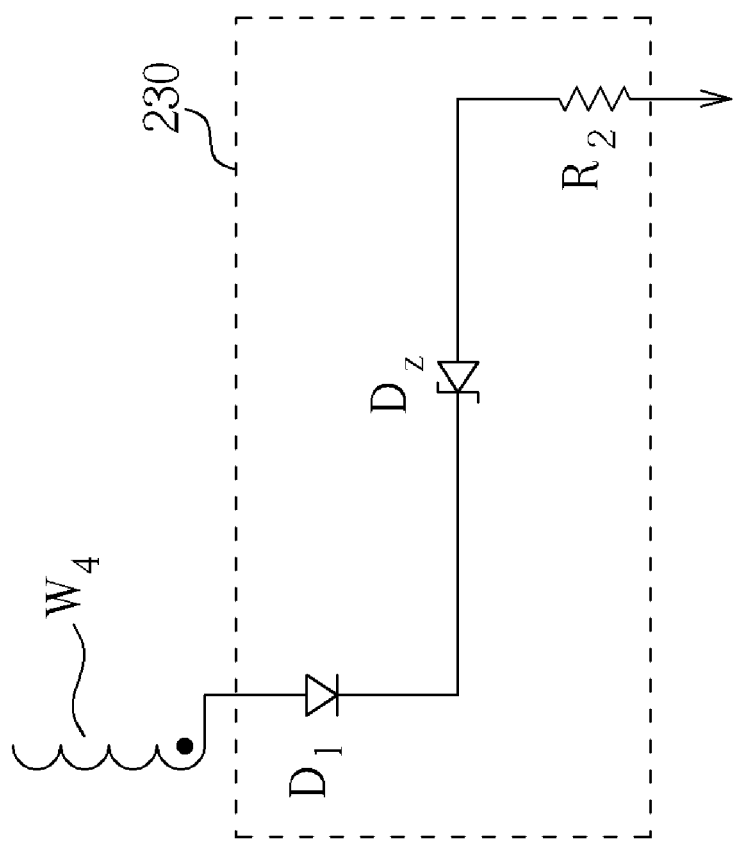
FIG. 4C is a circuit diagram of the compensation signal generating circuit shown in FIG. 2 according to a fourth varied embodiment of the present invention.

Furthermore, Zener diode $D_Z$ is not restricted to be co-operated together with the low-pass filter formed by resistor $R_1$ and capacitor $C_1$. Accordingly, in other embodiments, compensation signal generating circuit 230 can be implemented by making use of any one of the circuit types shown in FIGS. 4B and 4C, each being capable of providing the adjustment value to calibrate the current limit $I_{limit}$ and maintain an energy-saving effect as well.

Figure 5:
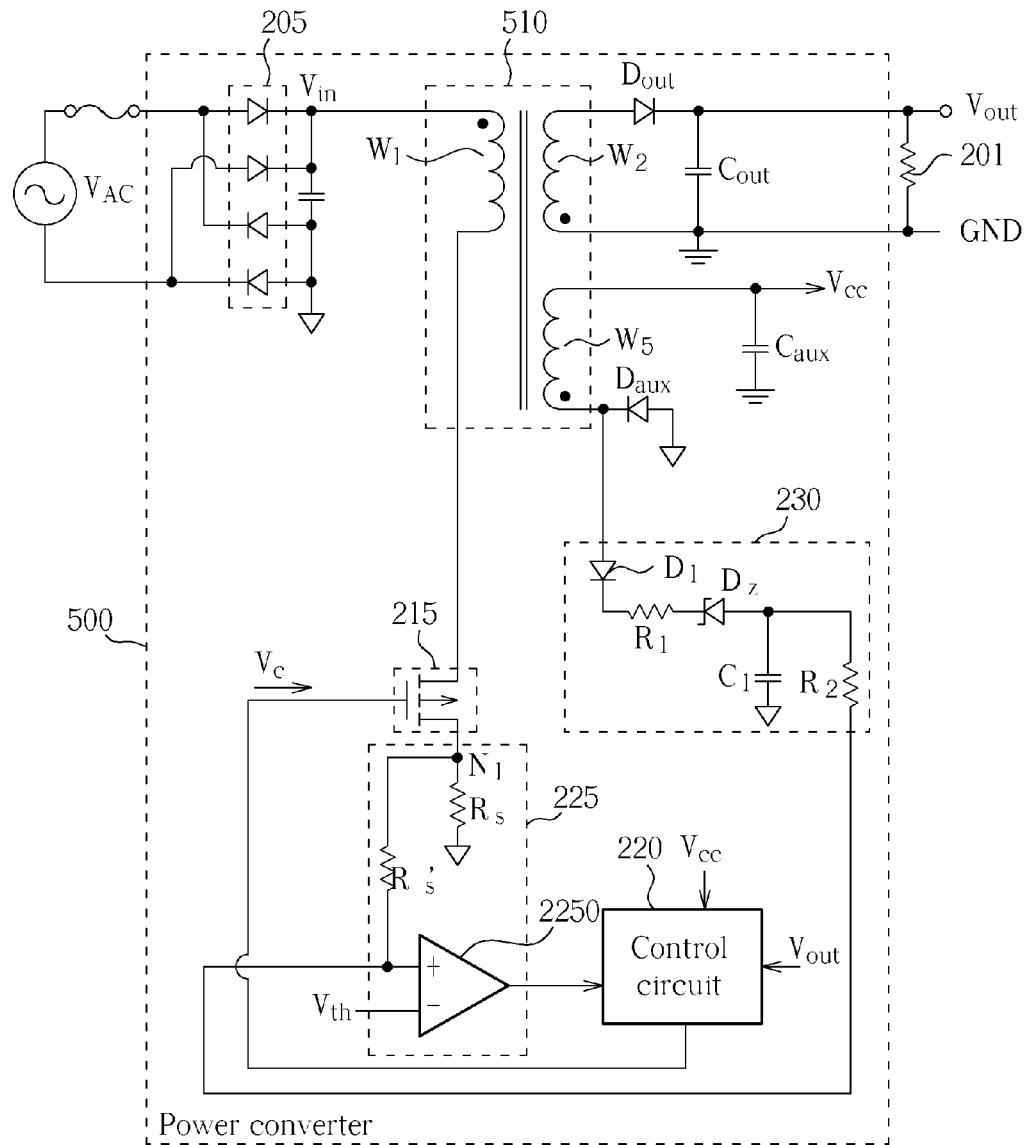
FIG. 5 is a circuit diagram of a flyback power converter according to a second embodiment of the present invention.

The transformer may have different designs as well. Please refer to FIG. 5. FIG. 5 is a circuit diagram of a flyback power converter 500 according to a second embodiment of the present invention. The difference between power converter 500 and power converter 200 is that transformer 510 included by the power converter 500 only has a winding $W_5$ used as the auxiliary winding, and that the connection manner of rectifier diode $D_{aux}$ is different. When switch element 215 is turned on, auxiliary winding $W_5$ is used for providing its output to compensation signal generating circuit 230 so as to provide the adjustment value; and when switch element 215 is turned off, auxiliary winding $W_5$ is used for providing the operating power $V_{CC}$ to control circuit 220. Certainly, circuit design of the compensation signal generating circuit 230 shown in FIG. 5 can be varied to employ any of the circuit types shown in FIG. 4A-FIG. 4C, conforming to the spirit of the present invention.

Those skilled in the art will readily observe that numerous modifications and alterations of the device and method may be made while retaining the teachings of the invention.

What is claimed is:

1. A power converter, comprising:
    a transformer, having a primary winding, a secondary winding, and at least one auxiliary winding, wherein the secondary winding is used for generating an output voltage provided to a load;
    a switch element;
    a control circuit, coupled to a control terminal of the switch element, for controlling on/off status of the switch element so as to control a primary current flowing through the primary winding;
    an over-current detecting circuit, for comparing the primary current with a current limit, and then controlling the control circuit to turn off the switch element if the primary current is greater than the current limit; and
    a compensation signal generating circuit, coupled between the auxiliary winding and the over-current detecting circuit, for providing an adjustment value to calibrate the current limit according to an output of the auxiliary winding without referring to any signal outputted by the secondary winding when the switch element is turned on;
    wherein when the switch element is turned on, the adjustment value varies with time.

2. The power converter of claim 1, wherein the compensation signal generating circuit comprises a low-pass filter, coupled between the auxiliary winding and the over-current detecting circuit.

3. The power converter of claim 2, wherein the low-pass filter comprises:
    a resistor, cascaded between the auxiliary winding and the over-current detecting circuit; and
    a capacitor, having a first terminal coupled to the resistor and a second terminal coupled to a reference level.

4. The power converter of claim 1, wherein the compensation signal generating circuit calibrates the current limit only when an output voltage of the auxiliary winding is greater than a voltage default value.

5. The power converter of claim 4, wherein the compensation signal generating circuit further comprises:

a Zener diode, coupled between the auxiliary winding and the over-current detecting circuit, for determining the voltage default value.

6. The power converter of claim 1, wherein the over-current detecting circuit comprises:
   a detecting resistor, connected to the switch element in series via a connection terminal; and
   a comparator, coupled between the connection terminal and the control circuit, for comparing the primary current with the current limit by detecting a cross voltage of the detecting resistor.

7. The power converter of claim 1, wherein when the switch element is turned off, the auxiliary winding provides an operating power to the control circuit; and when the switch element is turned on, the auxiliary winding is able to calibrate the current limit.

8. The power converter of claim 7, wherein the auxiliary winding comprises:
   a first winding and a second winding cascaded to each other;
   wherein a first output terminal of the first winding is used for providing the operating power to the control circuit, and a second output terminal of the second winding is connected to the compensation signal generating circuit.

9. A method applied to a power converter, the power converter at least comprising a switch element and a transformer having a primary winding as well as a secondary winding and at least one auxiliary winding, the method comprising:
   controlling on/off status of the switch element so as to control a primary current flowing through the primary winding;
   comparing the primary current with a current limit, and turning off the switch element if the primary current is greater than the current limit; and
   when the switch element is turned on, providing an adjustment value varying with time to calibrate the current limit according to an output of the auxiliary winding without referring to any signal outputted by the secondary winding which is used for generating an output voltage provided to a load.

10. The method of claim 9, wherein the step to calibrate the current limit is executed only when an output voltage of the auxiliary winding is greater than a voltage default value.

11. The method of claim 9, wherein the step of comparing the primary current with the current limit comprises:
   connecting a detecting resistor to the switch element in series; and
   comparing the primary current with the current limit by detecting a cross voltage of the detecting resistor.

12. The method of claim 9, further comprising:
   when the switch element is turned off, providing an operating power to the control circuit via the auxiliary winding.

* * * * *